(12) United States Patent
Sartori et al.

(10) Patent No.: US 11,082,169 B2
(45) Date of Patent: *Aug. 3, 2021

(54) SYSTEM AND METHOD FOR A LONG-TERM EVOLUTION (LTE)-COMPATIBLE SUBFRAME STRUCTURE FOR WIDEBAND LTE

(71) Applicant: Futurewei Technologies, Inc., Plano, TX (US)

(72) Inventors: Philippe Sartori, Plainfield, IL (US); Vipul Desai, Palatine, IL (US); Qian Cheng, Naperville, IL (US); Lukasz Krzymien, Rolling Meadows, IL (US); Carmela Cozzo, San Diego, CA (US); Weimin Xiao, Hoffman Estates, IL (US); Anthony C. K. Soong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/892,070

(22) Filed: Jun. 3, 2020

(65) Prior Publication Data

US 2020/0295890 A1    Sep. 17, 2020

Related U.S. Application Data

(63) Continuation of application No. 15/162,202, filed on May 23, 2016, now Pat. No. 10,693,602.
(Continued)

(51) Int. Cl.
*H04W 72/00* (2009.01)
*H04L 5/00* (2006.01)
(Continued)

(52) U.S. Cl.
CPC .......... *H04L 5/0005* (2013.01); *H04L 5/0007* (2013.01); *H04L 5/0064* (2013.01);
(Continued)

(58) Field of Classification Search
CPC ... H04L 5/0005; H04L 5/0092; H04L 5/0064; H04L 5/0007; H04W 72/1289; H04W 72/0453
(Continued)

(56) References Cited

U.S. PATENT DOCUMENTS 8,885,589 B2 * 11/2014 Kim .................. H04W 72/0406
370/329
9,031,019 B2 * 5/2015 Kim .................. H04W 74/0833
370/329
(Continued)

FOREIGN PATENT DOCUMENTS

| CN | 102223214 A | 10/2011 |
| CN | 102246442 A | 11/2011 |

(Continued)

OTHER PUBLICATIONS

"3rd Generation Partnership Project;Technical Specification Group Radio Access Network; Evolved Universal Terrestrial Radio Access (E-UTRA); Physical channels and modulation(Release 11),"3GPP TS 36.211 V11.5.0 (Dec. 2013), 120 pages.
(Continued)

*Primary Examiner* — Marceau Milord
(74) *Attorney, Agent, or Firm* — Slater Matsil, LLP

(57) ABSTRACT

A system and method of scheduling transmissions. A wireless device such as an eNodeB (eNB) may schedule a transmission of a wideband (WB) signal on a micro-frame selected from a plurality of WB micro-frames of a WB carrier. A narrowband (NB) subframe may span a portion of the selected WB micro-frame in the frequency-domain, and
(Continued)

the selected WB micro-frame may overlap at least a portion of the NB subframe in the time-domain. The WB signal and an NB signal may be transmitted over the WB micro-frame and the NB subframe in accordance with a first numerology and a second numerology, respectively. A WB subframe may be divided into a plurality of micro-frames. The transmission direction of the WB micro-frame may be scheduled according to a transmission rule based on the contents of a payload in the NB subframe.

20 Claims, 6 Drawing Sheets

Related U.S. Application Data

(60) Provisional application No. 62/168,255, filed on May 29, 2015.

(51) Int. Cl.
*H04W 72/12* (2009.01)
*H04W 72/04* (2009.01)

(52) U.S. Cl.
CPC ....... *H04L 5/0092* (2013.01); *H04W 72/1289* (2013.01); *H04W 72/0453* (2013.01)

(58) Field of Classification Search
USPC .................................................. 455/450, 69
See application file for complete search history.

(56) References Cited

U.S. PATENT DOCUMENTS

| | | | | |
|---|---|---|---|---|
| 9,042,342 B2* | 5/2015 | Iwai | ...................... | H04L 5/0048 370/331 |
| 9,585,131 B2* | 2/2017 | Gao | ...................... | H04L 1/0026 |
| 9,590,749 B2* | 3/2017 | Chen | ...................... | H04L 1/0026 |
| 10,693,602 B2* | 6/2020 | Sartori | .................. | H04L 5/0005 |
| 2009/0109914 A1* | 4/2009 | McBeath | ............ | H04W 72/042 370/329 |
| 2009/0312028 A1* | 12/2009 | Burchfiel | ............. | H04B 7/0408 455/450 |
| 2012/0257519 A1* | 10/2012 | Frank | .................... | H04W 52/16 370/252 |
| 2013/0034029 A1 | 2/2013 | Lee | | |
| 2013/0051272 A1 | 2/2013 | Wilberg et al. | | |
| 2013/0064119 A1 | 3/2013 | Montojo et al. | | |
| 2013/0077638 A1* | 3/2013 | Kim | .................... | H04L 12/2838 370/462 |
| 2013/0336160 A1* | 12/2013 | Yin | ...................... | H04L 5/0055 370/254 |
| 2013/0336177 A1* | 12/2013 | Gao | ...................... | H04L 5/1476 370/280 |
| 2014/0328260 A1* | 11/2014 | Papasakellariou | .... | H04L 1/1861 370/329 |
| 2015/0173069 A1* | 6/2015 | Cucala Garcia | .. | H04W 72/0426 370/329 |
| 2015/0180622 A1* | 6/2015 | Yoo | ...................... | H04L 5/0076 370/330 |
| 2015/0188690 A1* | 7/2015 | Khoryaev | ............. | H04W 74/00 370/280 |
| 2016/0043831 A1* | 2/2016 | Seo | .......................... | H04L 1/08 714/748 |
| 2016/0044663 A1* | 2/2016 | Yao | ...................... | H04L 1/1671 370/336 |
| 2016/0142115 A1* | 5/2016 | Onggosanusi | ......... | H04B 7/065 370/252 |
| 2016/0156397 A1* | 6/2016 | Onggosanusi | .......... | H04L 5/005 370/252 |
| 2016/0270116 A1* | 9/2016 | Lin | ...................... | H04W 72/14 |
| 2016/0353443 A1 | 12/2016 | Desai et al. | | |
| 2016/0353476 A1 | 12/2016 | Sartori et al. | | |
| 2017/0041119 A1* | 2/2017 | Ang | .................... | H04W 72/042 |
| 2017/0332286 A1 | 11/2017 | Lepp et al. | | |
| 2019/0064119 A1* | 2/2019 | Williams | ........... | G01N 29/2418 |

FOREIGN PATENT DOCUMENTS

| | | |
|---|---|---|
| CN | 103493556 A | 1/2014 |
| CN | 104521304 A | 4/2015 |

OTHER PUBLICATIONS

"3rd Generation Partnership Project; Technical Specification Group Radio Access Network; Evolved Universal Terrestrial Radio Access (E-UTRA); Physical channels and modulation(Release 12)," 3GPP TS 36.211 V12.5.0 (Mar. 2015), 136 pages.

"LTE; Evolved Universal Terrestrial Radio Access (E-UTRA); Physical Channels and Modulation (3GPP TS 36.211 Version 10.0.0 Release 10)," ETSI TS 136 211 V10.0.0, Technical Specification, Jan. 2011, 105 pages.

"LTE; Evolved Universal Terrestrial Radio Access (E-UTRA); Physical layer procedures (3GPP TS 36.213 version 11.5.0 Release 11)," ETSI TS 136 213 V11.5.0 (Jan. 2014), 184 pages.

"Combination of ACK/NACKs for TDD," Source: Ericsson, Agenda Item: 6.1.4, Document for: Discussion and Decision, TSG-RAN WG1 #52, R1-080870, Sorrento, Italy, Feb. 11-15, 2008, 2 pages.

CATT, "New work item proposal for Further Enhancements to LTE TDD for DL-UL Interference Management and Traffic Adaptation," 3GPP TSG-RAN Meeting #58, RP-121772, Dec. 4-7, 2012, 15 pages, Barcelona, Spain.

* cited by examiner

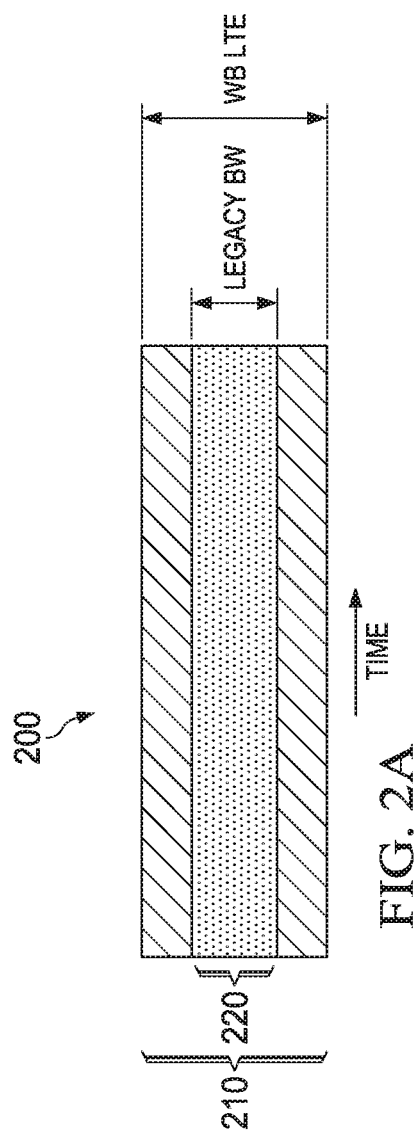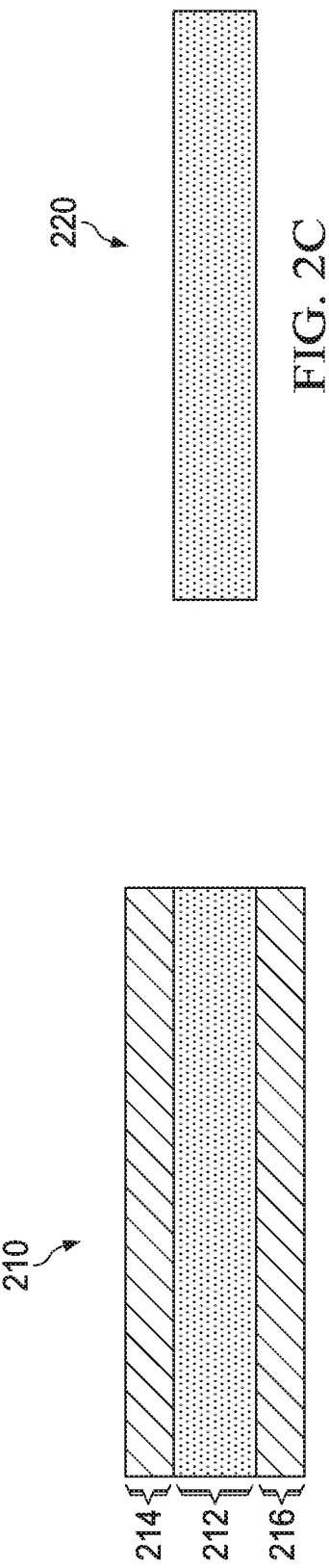
FIG. 2A
FIG. 2B
FIG. 2C though these embodiments are discussed primarily in the context of LTE networks, it should be appreciated that the inventive aspects disclosed herein may be applied to other types of wireless networks.

SYSTEM AND METHOD FOR A LONG-TERM EVOLUTION (LTE)-COMPATIBLE SUBFRAME STRUCTURE FOR WIDEBAND LTE

CROSS-REFERENCE TO RELATED APPLICATION

This patent application is a continuation of U.S. patent application Ser. No. 15/162,202, filed on May 23, 2016 and entitled "System and Method for a Long-Term Evolution (LTE)-Compatible Subframe Structure for Wideband LTE", which claims priority to U.S. Provisional Application No. 62/168,255, filed on May 29, 2015 and entitled "System and Method for an LTE-Compatible Subframe Structure for Wideband LTE". The aforementioned applications are hereby incorporated by reference herein as if reproduced in their entireties.

TECHNICAL FIELD

The present invention relates generally to managing the allocation of resources in a network, and in particular embodiments, to techniques and mechanisms for a long-term evolution (LTE)-compatible subframe structure for wideband LTE.

BACKGROUND

The current spectrum allocation for cellular systems is becoming inadequate in capacity as the number of users and the amount of traffic increase. While more frequency bands can be included for the cellular communication, these frequency bands are usually higher in frequency (e.g., 3.5 gigahertz (GHz)-6 GHz) than the traditional cellular bands (e.g., 1100 MHz to 2.5 GHz), typically larger in contiguous bandwidth (e.g., up to 400 MHz) compared to the typical maximum of 20 MHz, and often unpaired such that only one band may be available for transmission and reception.

SUMMARY OF THE INVENTION

Technical advantages are generally achieved, by embodiments of this disclosure which describe a system and method for an LTE-compatible subframe structure for wideband LTE.

In accordance with an embodiment, a method for scheduling transmissions is provided, as may be performed by an eNodeB (eNB). In this example, the method includes selecting a wideband micro-frame from a plurality of wideband micro-frames of a wideband carrier. A narrowband subframe spans a portion of the selected wideband micro-frame in the frequency-domain, and the selected wideband micro-frame overlaps at least a portion of the narrowband subframe in the time-domain. The method further includes scheduling a wideband transmission to be performed on resources of the selected wideband micro-frame in accordance with a transmission direction of signaling carried in the portion of the narrowband subframe that overlaps the selected wideband micro-frame in the time-domain. A downlink wideband transmission is scheduled to be performed on the resources in the selected wideband micro-frame when downlink signaling is carried in the portion of the narrowband subframe that overlaps the selected wideband micro-frame in the time-domain. An uplink wideband transmission is scheduled to be performed on the resources in the selected wideband micro-frame when uplink signaling is carried in the portion of the narrowband subframe that overlaps the selected wideband micro-frame in the time-domain. The method further includes signaling the wideband transmission scheduling to a user equipment (UE). An apparatus for performing this method is also provided.

In accordance with another embodiment, a method for wireless communications is provided, as may be performed by wireless devices. The method includes transmitting, by a first wireless device, to a second wireless device a wideband subframe consisting of N micro-frames. The N micro-frames have a combined duration that is equal to a duration of a single narrowband subframe. The method further includes transmitting, by the second wireless device, to the first wireless device an acknowledgement or a negative acknowledgement on the earliest available micro-frame at least a predetermined number of subframes after the corresponding wideband subframe. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 2A-2C illustrate a diagram of an embodiment wideband (WB)-LTE architecture;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Some frequency bands that were not utilized for cellular systems are being considered to be used for future cellular systems. To operate at these frequencies, one option is to enhance the physical layer of the existing LTE systems to operate with larger bandwidths. This design may reduce latency and overhead, as well as increase throughput. Thus, a compatible frame structure that accommodates these frequency bands is desired.

Disclosed herein is an embodiment LTE-compatible subframe structure for wideband LTE that allows a wideband (WB) signal and a narrowband (NB) signal to be simultaneously transmitted in accordance with a first numerology and a second numerology, respectively. The NB signal may be transmitted over a legacy LTE carrier bandwidth and the WB signal may be transmitted over the LTE frequency band in addition to previously unused frequency sub-bands. Both the WB signal and the NB signal may be transmitted simultaneously over the same center frequency with the NB signal spanning a subset of subcarrier frequencies spanned by the WB signal. A WB subframe may be further divided into a plurality of micro-frames, while a total duration of the WB subframe stays the same as a duration of a single NB subframe.

Micro-frames of a WB subframe may be scheduled according to a transmission rule based on the contents of a payload in an NB subframe. For example, the transmission rule may prohibit uplink (UL) transmissions from being scheduled on the one or more micro-frames of the WB subframe when the payload of the NB subframe carries downlink (DL) data, and vice versa. One or more leading micro-frames of the WB subframe may be statically assigned to carry DL transmissions, and one or more trailing micro-frames of the WB subframe may be dynamically assigned to carry DL transmissions, UL transmissions, or combinations thereof. On the other hand, one or more leading micro-frames of the WB subframe may be statically assigned to carry UL transmissions, and one or more trailing micro-frames of the WB subframe may be dynamically assigned to carry UL transmissions, DL transmissions, or combinations thereof. These and other aspects are disclosed in greater detail below.

Figure 1:
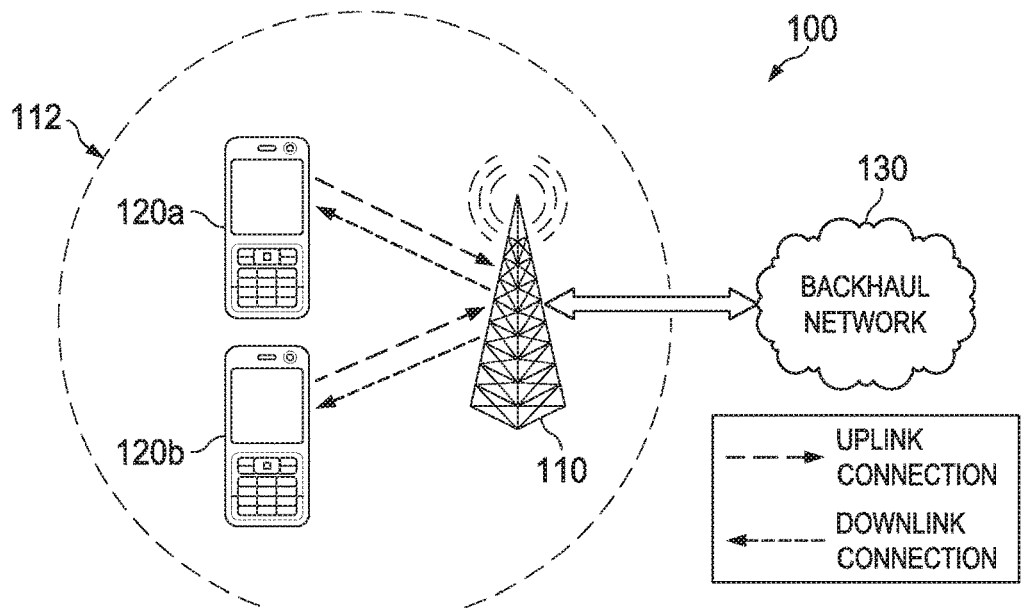
FIG. 1 illustrates a diagram of an embodiment wireless communications network.

FIG. 1 illustrates a network 100 for communicating data. The network 100 comprises a base station 110 having a coverage area 112 and a plurality of mobile devices 120 (120a, 120b), and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced Node B (eNB), a macro-cell, a femtocell, a Wi-Fi access point (AP), or other wirelessly enabled devices. The terms "eNB" and "base station" are used interchangeably throughout this disclosure. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices.

In some embodiments, the network 100 may comprise various other wireless devices, such as relays, low power nodes, etc.

FIG. 2A illustrates an embodiment wideband (WB)-LTE architecture that can accommodate legacy UEs. Legacy UEs may transmit and receive an NB signal 220 over the legacy LTE carrier bandwidth. Next generation UEs may transmit and receive a WB signal 210 over the WB LTE carrier bandwidth. As shown, the NB signal 220 spans a subset of subcarrier frequencies spanned by the WB signal 210. FIG. 2B illustrates the WB signal 210 (individually), and FIG. 2C illustrates the NB signal 220 (individually). As shown, the WB signal 210 may include a zero power portion 212 and two non-zero power portions 214, 216; the zero power portion 212 of the WB signal 210 may span the same set of subcarrier frequencies as the NB signal 220. The NB signal 220 may span a subset of subcarrier frequencies spanned by the zero power portion 212. The zero power portion 212 of the WB signal 210 may be positioned in between the non-zero power portions 214, 216 of the WB signal 210 in the frequency domain. In the example, the zero power portion 212 of the WB signal 210 spans the center frequency of the WB signal 210. In other examples, the zero power portion 212 of the WB signal 210 does not span the center frequency of the WB signal 210. In such examples, the zero power portion 212 may be partially offset from the center carrier frequency of the WB signal 210 such that one of the non-zero power portions 214, 216 is wider than the other. Alternatively, the zero power portion 212 may be located at the edge of the WB LTE bandwidth such that the WB signal 210 includes a single non-zero power portion. Other configurations are also possible.

LTE operations over the legacy carrier bandwidth may stay compliant with existing LTE standards. The overall radio frame structure of the WB signal 210 may also be compliant with the existing LTE standards. Table 1 lists some possible bandwidth configurations for the WB signal 210.

TABLE 1

| Sample Rate (Msamp/s) | FFT Size | Bandwidth, MHz | PRBs |
| --- | --- | --- | --- |
| 30.72 | 2048 | 20 | 100 |
| 61.44 | 4096 | 40 | 200 |
| 122.88 | 8192 | 80 | 400 |
| 245.76 | 16384 | 160 | 800 |
| 491.52 | 32768 | 320 | 1000 |

Figure 3:
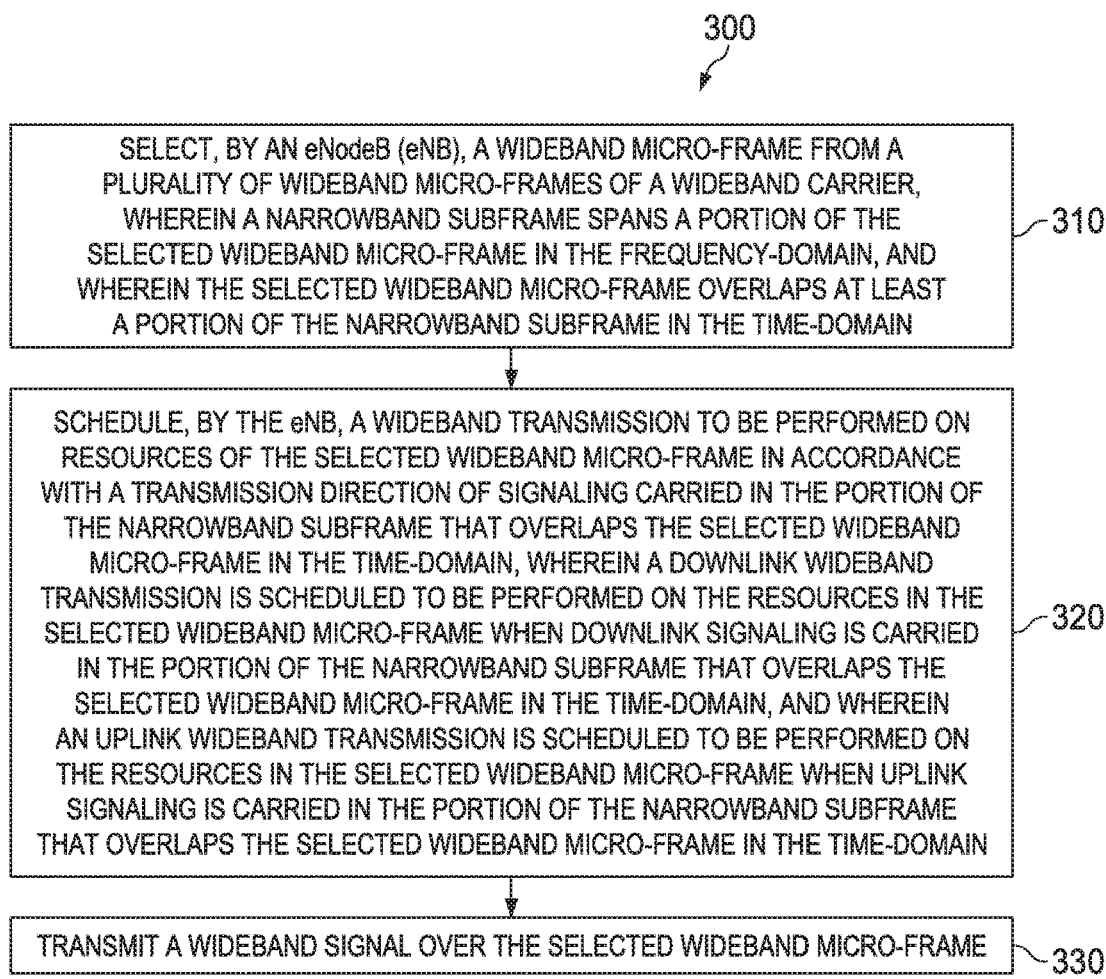
FIG. 3 illustrates a flowchart of an embodiment method for scheduling a WB signal.

FIG. 3 illustrates an embodiment method 300 for scheduling a WB signal, as may be performed by a wireless device such as a controller (e.g., base station, central controller, etc.). As shown, the method 300 begins at step 310, where a WB micro-frame is selected by the controller from a plurality of WB micro-frames of a WB carrier. A NB subframe may span a portion of the selected WB microframe in the frequency-domain, and the selected WB micro-frame may overlap at least a portion of the NB subframe in the time-domain. Thereafter, the method 300 proceeds to step 320, where a WB transmission is scheduled by the controller to be performed on resources of the selected WB micro-frame in accordance with a transmission direction of signaling carried in the portion of the NB subframe that overlaps the selected WB micro-frame in the time-domain. A downlink WB transmission may be scheduled to be performed on the resources in the selected WB micro-frame when downlink signaling is carried in the portion of the NB subframe that overlaps the selected WB micro-frame in the time-domain. Similarly, an uplink WB transmission may be scheduled to be performed on the resources in the selected WB micro-frame when uplink signaling is carried in the portion of the NB subframe that overlaps the selected WB micro-frame in the time-domain.

Subsequently, the method 300 proceeds to step 330, where a WB signal is transmitted over the selected WB micro-frame. The controller may communicate the micro-frame scheduling assignments to a UE with the capability of transmitting and/or receiving WB signals. A wireless device with the capability of transmitting and/or receiving WB signals, such as the controller or a UE, may transmit a WB signal in accordance with a first numerology. The subset of physical layer parameters used to communicate a signal over a carrier are collectively referred to as the "numerology" of the carrier, and may include a combination, or subset, of a transmission time interval (TTI) used to transmit the signal over the carrier, a symbol duration of symbols transmitted over the carrier, a cyclic prefix (CP) length of symbols transmitted over the carrier, and a sub-carrier spacing between sub-carrier frequencies over which the signal is transmitted.

The wireless device may transmit an NB signal in accordance with a second numerology that is different than the first numerology. The WB signal and at least a portion of the NB signal may overlap in the time-domain. For example, both the WB signal and the NB signal may be transmitted simultaneously over the same center frequency. As discussed above, the NB signal may span a subset of subcarrier frequencies spanned by the WB signal.

The first numerology and the second numerology may include a common subset of physical layer parameters for communicating over the NB bandwidth and the WB bandwidth. The common subset of physical layer parameters may include a common subcarrier frequency spacing between subcarriers in both the NB bandwidth and the WB bandwidth, a common symbol duration for symbols in both the NB bandwidth and the WB bandwidth, a common duration of a radio frame, a common duration of a subframe, and/or some other physical layer parameter.

Some features of the cellular systems allow uplink (UL)-downlink (DL) configuration for time division duplexing (TDD) mode to change periodically, for example every 10 ms. Alternatively, the UL-DL configuration may be chosen from one option in Table 2.

TABLE 2

| Uplink-downlink configuration | 0 | 1 | 2 | 3 | 4 | 5 | 6 | 7 | 8 | 9 |
|---|---|---|---|---|---|---|---|---|---|---|
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 2, "D" represents a DL subframe, "U" represents an UL subframe, and "S" represents a special subframe. In current systems, a subframe may be defined as 30,720 samples where the sample rate (1/Ts) is 30,720,000 samples/second. In the special subframe, the samples are grouped into three sets. The first set of samples forms the downlink pilot timeslot (DwPTS), the second set of samples forms the guard period (G), and the last set forms the uplink pilot timeslot (UpPTS). The number of samples in each set is defined by the standards. The guard period allows the device to switch from receiving DL transmissions to transmitting UL transmissions as well as allowing timing advance.

With dynamic switching of the uplink-downlink configuration, one or more capable UEs may monitor downlink control information (DCI) format 1C to determine the uplink-downlink configuration for the next radio frame. DCI format 1C is transmitted on the physical downlink control channel (PDCCH) using the common search space rules. There are certain uplink-downlink configurations that can be grouped together, such as ((4, 0, 1, 3, 6), (5, 0, 1, 2, 3, 6), (2, 0, 1, 6)).

Figure 4:
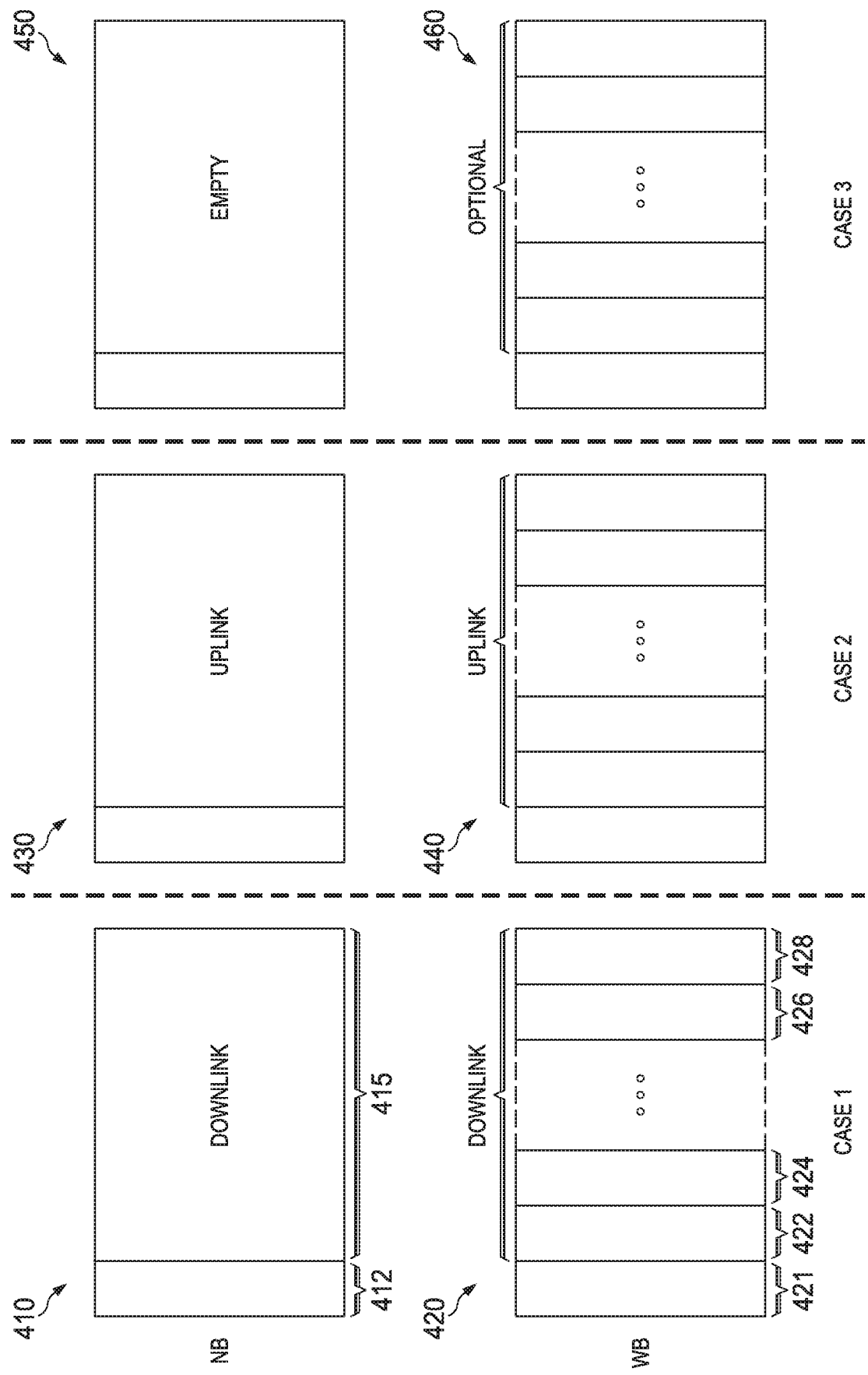
FIG. 4 illustrates a diagram of an embodiment scheduling scheme for WB signals.

FIG. 4 illustrates an embodiment scheduling scheme for WB signals. Micro-frames 412 and 421 may be used for control channel transmissions, for example physical downlink control channel (PDCCH). As shown in Case 1, when a payload 415 of an NB subframe 410 is scheduled for DL transmissions, micro-frames 422-428 of a corresponding WB subframe 420 may also be scheduled for DL transmissions. In Case 2, when a payload of an NB subframe 430 is scheduled for UL transmissions, micro-frames of a corresponding WB subframe 440 may also be scheduled for UL transmissions. In Case 3, when a payload of an NB subframe 450 is empty, micro-frames of a corresponding WB subframe 460 may be scheduled for either DL or UL transmissions. It should be noted that in some embodiments, some micro-frames of a WB subframe may be scheduled for UL transmissions, and the remaining microframes of the WB subframe may be scheduled for DL transmissions. Some micro-frames of a WB subframe may be pre-scheduled, and the remaining micro-frame of the WB subframe may be scheduled dynamically. In an example, the start symbols of a WB subframe may be 2× ceiling(control format indicator (CFI)/2) where a CFI indicates the length of the control region (number of symbols used for PDCCH).

A guard interval may be transmitted between the UL micro-frames and DL micro-frames. The guard interval between micro-frames carrying UL data and micro-frames carrying DL data in the WB subframe may be defined as one symbol duration, half a symbol duration, or some other duration. Initial access to the WB subframe may be performed by transmitting WB configurations over NB subframes. For example, the base station 110 may communicate parameters of the WB signal, such as the bandwidth, sub-carrier spacing, and/or center carrier frequency of the WB signal, to the UE 120a or 120b over the NB signal. Configurations of the WB signal may be transmitted in broadcast messages and/or radio resource control (RRC) messages.

An acknowledgement/negative acknowledgement (A/N or ACK/NACK) may be sent by a UE on the earliest available micro-frame at least a predetermined number of subframes after the corresponding DL micro-frame. The predetermined number may be four, two, or some other number. However, for some DL micro-frames, if the next subframe(s) is DL only, then the A/N may be delayed. A WB device may need to know the NB subframe configuration, which may be obtained by decoding the NB signals. Alternatively, the WB capable device may operate in a WB mode only. In such a case, the NB subframe configuration may need to be known and/or signaled to WB devices. This could be done, e.g., in a physical control format indicator channel (PCFICH) in the first micro-frame of the first subframe of a radioframe or in some other location.

Figure 5:
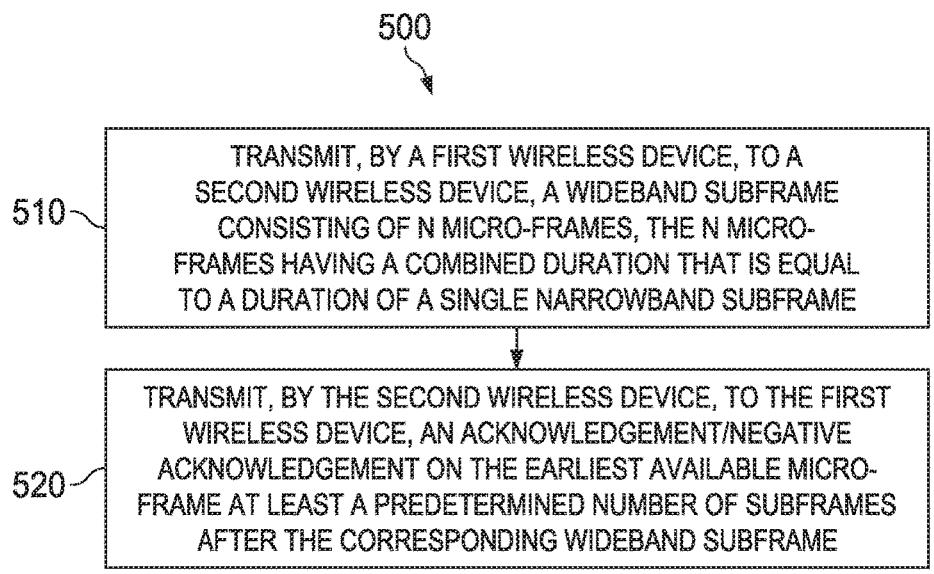
FIG. 5 illustrates a flowchart of an embodiment method for transmitting WB signals.

FIG. 5 illustrates an embodiment method 500 for transmitting WB signals, as may be performed by wireless devices (e.g., eNBs, UEs, etc.). As shown, the method 500 begins at step 510, where a first wireless device transmits to a second wireless device a WB subframe consisting of N micro-frames. The N micro-frames may have a combined duration that is equal to a duration of a single NB subframe. Thereafter, the method 500 proceeds to step 520, where the second wireless device transmits to the first wireless device an acknowledgement/negative acknowledgement on the earliest available micro-frame at least a predetermined number of subframes after the corresponding wideband subframe.

Figure 6:
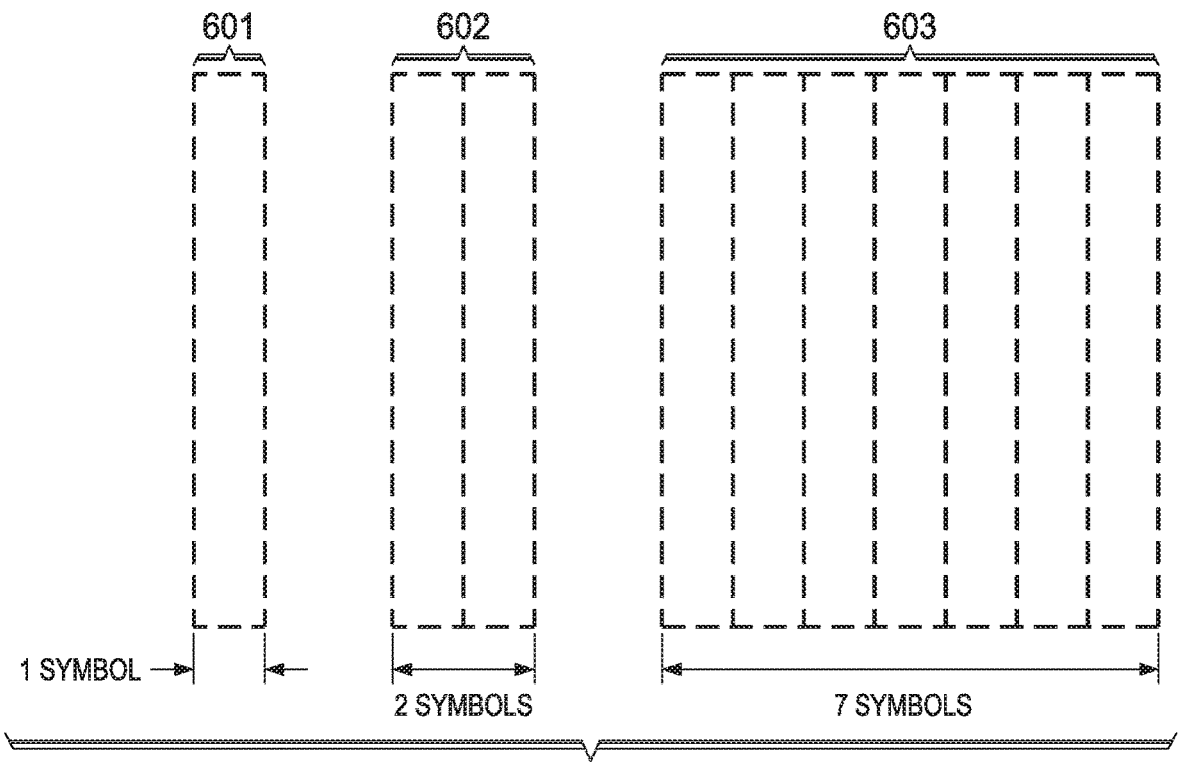
FIG. 6 illustrates a diagram of three embodiment schemes for defining transmission time intervals (TTIs) of WB signals.

FIG. 6 illustrates three embodiment WB transmission time intervals (TTIs) 601, 602, 603. A TTI of the WB signal may have the same duration as, or a different duration than a TTI of an NB signal. As shown, the WB TTI 601 has a one symbol duration (e.g., one fourteenth of a millisecond (ms)), the WB TTI 602 has a two symbol duration (e.g., one seventh of a ms), and the WB TTI 603 has a seven symbol duration (e.g., half a ms). Other durations are also possible.

Figure 7:
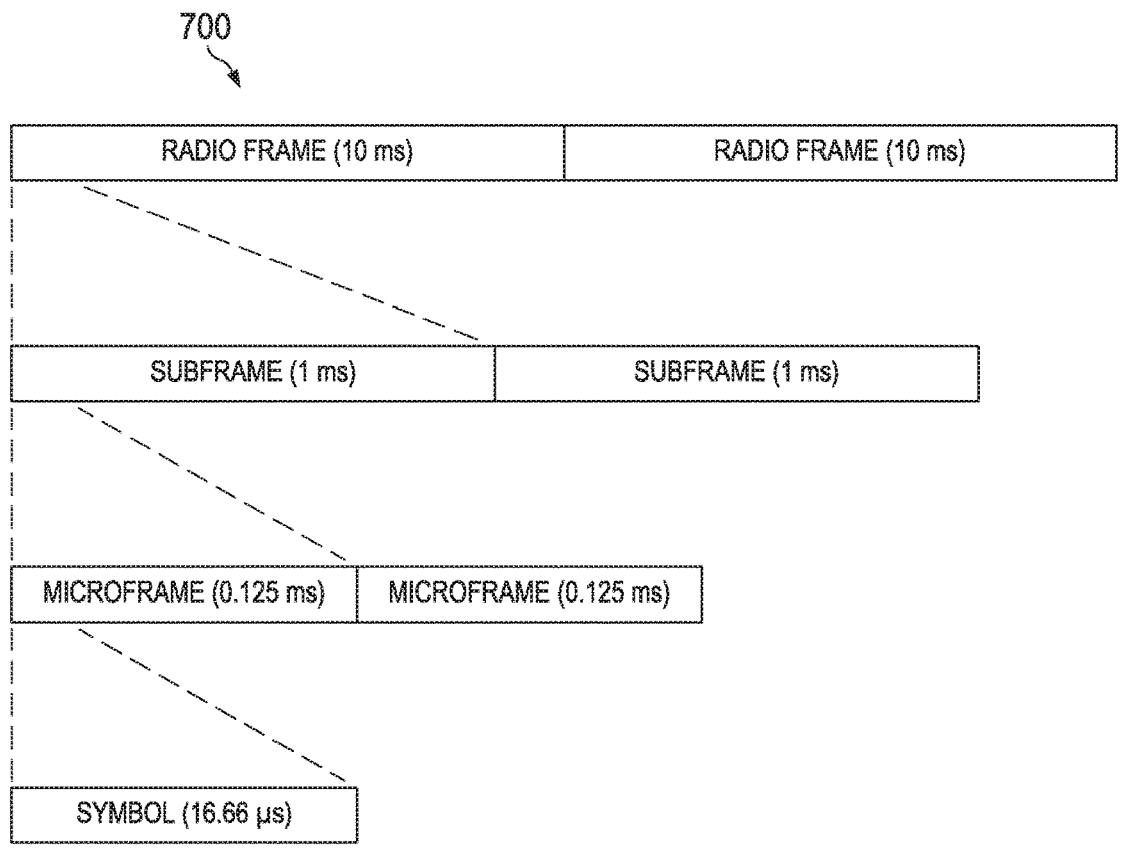
FIG. 7 illustrates a diagram of an embodiment micro-frame structure for WB signals.

FIG. 7 illustrates an embodiment micro-frame structure 700 for WB signals. As shown, the durations of radio frames, subframes, and symbols of WB signals may stay the same as those of legacy LTE radio frames, subframes, and symbols. A radio frame for the WB signal may be ten ms long and comprises ten subframes that each is one ms long. In an embodiment, each WB subframe may be further divided into micro-frames, for example into six, seven, eight, or some other number of micro-frames. A micro-frame may comprise six, seven, or some other number of symbols, depending at least partially on whether a guard interval is needed between UL and DL micro-frames. A micro-frame structure, e.g. the number of symbols in the micro-frame and so on, may be predetermined and/or based on a subframe index.

Figure 8:
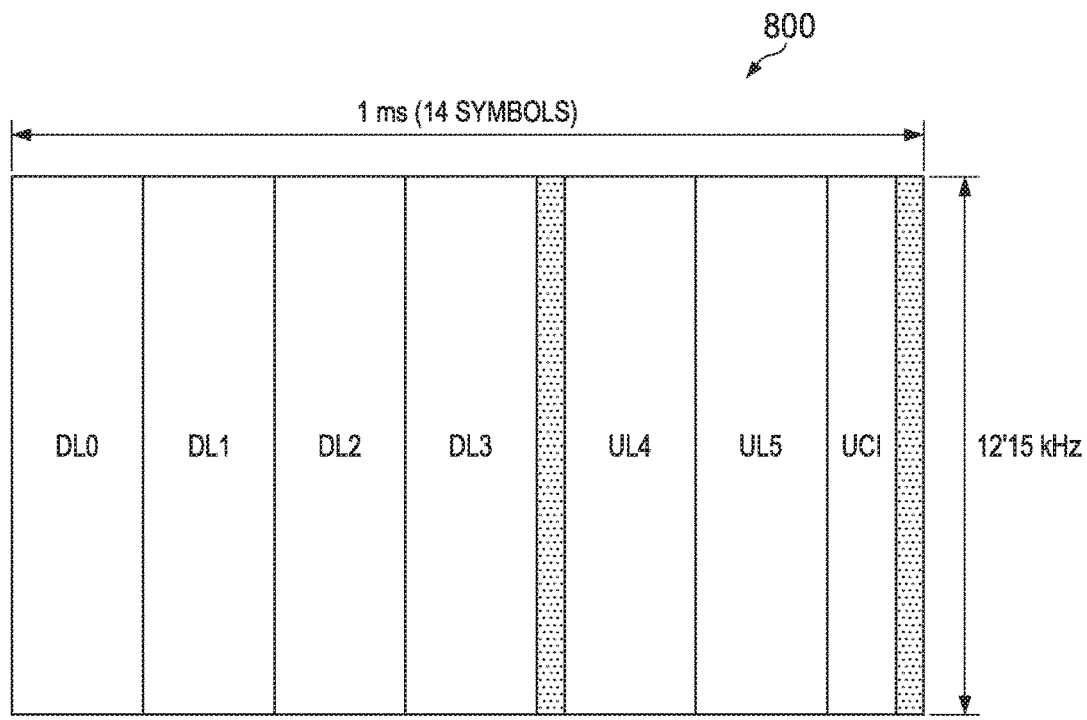
FIG. 8 illustrates a diagram of an embodiment WB subframe.

FIG. 8 illustrates an embodiment WB subframe 800. In this example, the first four micro-frames of the WB subframe 800 carry downlink transmissions and the last two micro-frames of the WB subframe 800 carry uplink transmissions. Other configurations are also possible. As shown, the first UL micro-frame starts half a symbol duration (guard interval) after the last DL micro-frame. The last symbol may be uplink control indicator (UCI) symbol reserved for carrying control information. It should be noted that the UCI symbol may be located elsewhere, e.g., the first symbol of the UL section of the subframe. Some acknowledgement and negative acknowledgement indicators for hybrid automatic repeat request (HARQ) processes may be transmitted as HARQ-ACK bits in the UCI sent on the physical uplink control channel (PUCCH).

Figure 9:
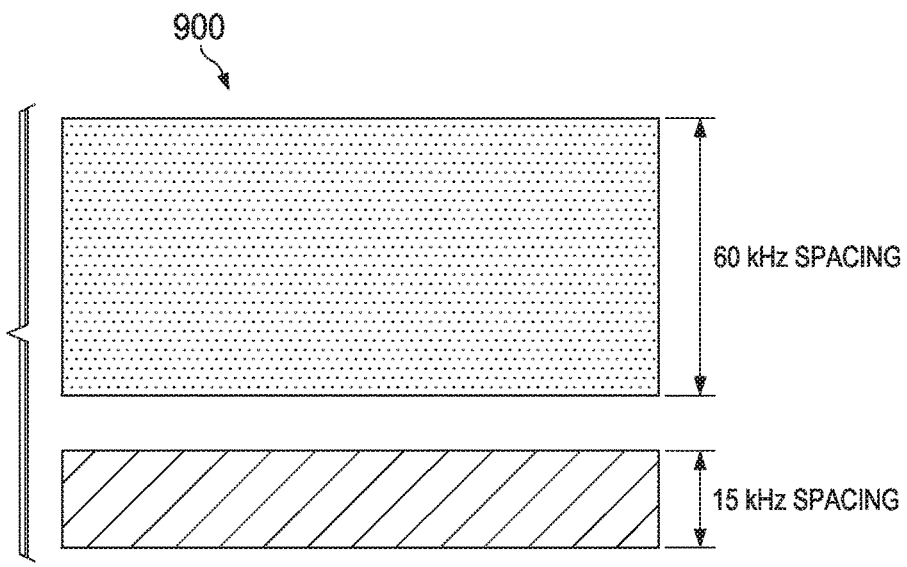
FIG. 9 illustrates a diagram of an embodiment WB signal structure with carrier aggregation.

Discussed above is one option to operate at higher frequencies and wider bandwidths for cellular systems. Another option is to use carrier aggregation (CA) to enable multiple 20 MHz carriers to fill the available bandwidths. FIG. 9 illustrates an embodiment WB signal structure with carrier aggregation. As shown, a fifteen kHz backward compatible carrier (a legacy carrier) in a high frequency band may be aggregated with another non-backward compatible carrier. The non-backward compatible carrier may have a different sub-carrier spacing, e.g., sixty kHz, as shown in FIG. 9. The legacy carrier may be used to support legacy UEs or provide assistance for UEs to access the new non-backward compatible carrier such as in initial access or random access. For example, prior to transmitting a WB signal on resources of a WB micro-frame selected for the wideband signal, configuration information of the WB micro-frame may be transmitted to a UE over an NB subframe. The benefit of this design includes that it just changes the carrier frequency to the higher frequencies while maintaining the design features of the current LTE system.

Figure 10:
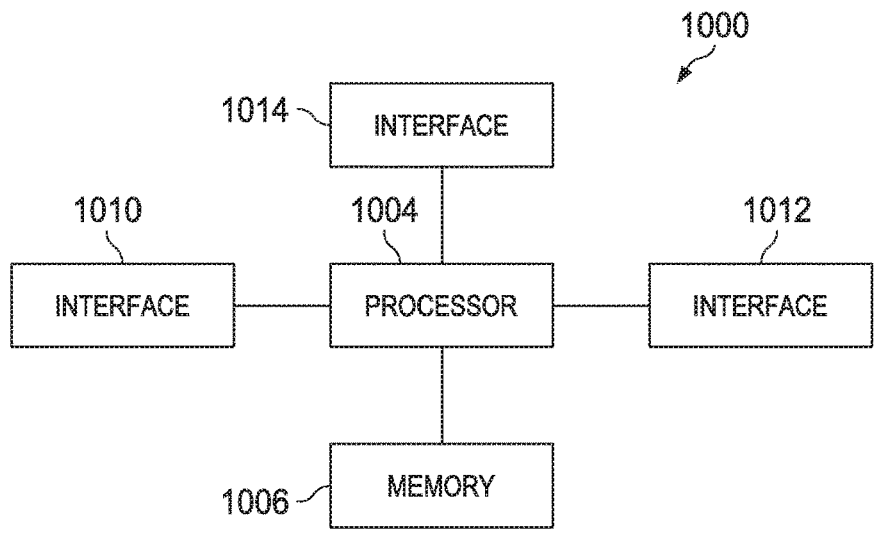
FIG. 10 illustrates a diagram of an embodiment processing system.

FIG. 10 illustrates a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
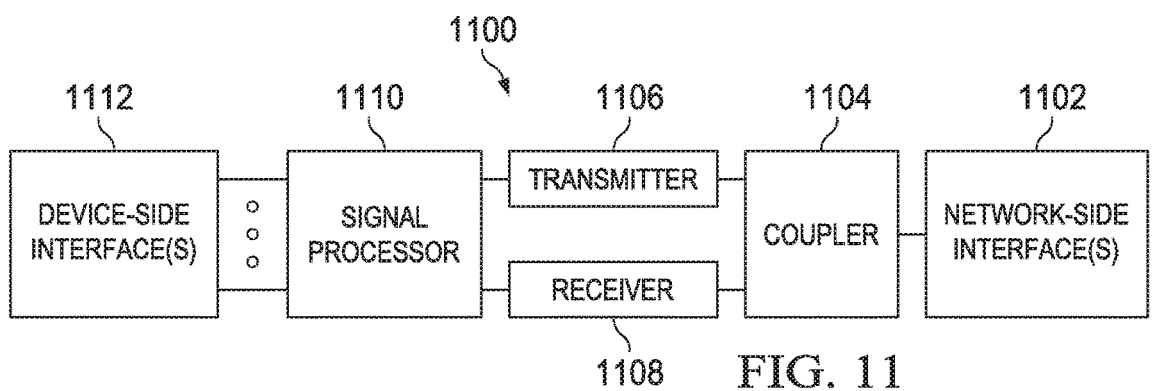
FIG. 11 illustrates a diagram of an embodiment transceiver.

In some embodiments, one or more of the interfaces 1010, 1012, 1014 connects the processing system 1000 to a transceiver adapted to transmit and receive signaling over the telecommunications network. FIG. 11 illustrates a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a scheduling unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method comprising:
    selecting, by a base station, a first micro-frame from a plurality of micro-frames in a subframe of a first carrier for a first transmission, wherein the selected first micro-frame having a time duration that covers a first symbol of a second carrier in a time-domain;
    scheduling, by the base station, the first transmission in the time duration of the selected first micro-frame in accordance with a signaling carried in the first symbol of the second carrier, wherein the first transmission is scheduled as a downlink transmission when the signaling is a downlink signaling, and wherein the first transmission is scheduled as an uplink transmission when the signaling is an uplink signaling; and
    signaling, by the base station, scheduling information of the first transmission to a user equipment (UE).

2. The method of claim 1, wherein a combined duration of the plurality of micro-frames is equal to a duration of the subframe.

3. The method of claim 1, wherein the second carrier has a bandwidth overlapping a portion of a bandwidth of the first carrier in a frequency domain.

4. The method of claim 1, further comprising:
    transmitting, by the base station, configuration information of the plurality of micro-frames of the first carrier to the UE.

5. The method of claim 1, wherein the first carrier is associated with a first numerology and the second carrier is associated with a second numerology different than the first numerology.

6. The method of claim 5, wherein the first numerology and the second numerology comprise different subcarrier spacings.

7. The method of claim 1, wherein the first transmission is performed using a subcarrier spacing that is different than the signaling.

8. A wireless device comprising:
    a processor; and
    a non-transitory computer readable storage medium storing programming for execution by the processor, the programming including instructions to:
    select a first micro-frame from a plurality of micro-frames in a subframe of a first carrier for a first transmission, wherein the selected first micro-frame having a time duration that covers a first symbol of a second carrier in a time-domain;
    schedule the first transmission in the time duration of the selected first micro-frame in accordance with a signaling carried in the first symbol of the second carrier, wherein the first transmission is scheduled as a downlink transmission when the signaling is a downlink signaling, and wherein the first transmission is scheduled as an uplink transmission when the signaling is an uplink signaling; and
    signal scheduling information of the first transmission to a user equipment (UE).

9. The wireless device of claim 8, wherein the second carrier has a bandwidth overlapping portion of a bandwidth of the first carrier in a frequency domain.

10. The wireless device of claim 8, wherein the first carrier is associated with a first numerology and the second carrier is associated with a second numerology different than the first numerology.

11. A method comprising:
    receiving, by a user equipment (UE), signaling that schedules a first transmission in a time duration of a first micro-frame selected from a plurality of micro-frames in a subframe of a first carrier, the time duration of the first micro-frame covering a first symbol of a second carrier in a time-domain, wherein the first transmission is a downlink transmission when the first symbol of the second carrier is configured to carry a downlink signaling, and the first transmission is an uplink transmission when the first symbol of the second carrier is configured to carry an uplink signaling.

12. The method of claim 11, wherein a combined duration of the plurality of micro-frames is equal to a duration of the subframe.

13. The method of claim 11, further comprising:
receiving, by the UE, configuration information of the first carrier.

14. The method of claim 13, wherein the configuration information comprises bandwidth, subcarrier spacing, or a center carrier frequency of the first carrier.

15. The method of claim 11, wherein the second carrier has a bandwidth overlapping a portion of a bandwidth of the first carrier in a frequency domain.

16. The method of claim 11, wherein the first carrier is associated with a first numerology and the second carrier is associated with a second numerology different than the first numerology.

17. The method of claim 16, wherein the first numerology and the second numerology comprise different subcarrier spacings.

18. A wireless device comprising:
a processor; and
a non-transitory computer readable storage medium storing programming for execution by the processor, the programming including instructions to:
signaling that schedules a first transmission in a time duration of a first micro-frame selected from a plurality of micro-frames in a subframe of a first carrier, the time duration of the first micro-frame covering a first symbol of a second carrier in a time-domain, wherein the first transmission is a downlink transmission when the first symbol of the second carrier is configured to carry a downlink signaling, and the first transmission is an uplink transmission when the first symbol of the second carrier is configured to carry an uplink signaling.

19. The wireless device of claim 18, wherein the second carrier has a bandwidth overlapping a portion of a bandwidth of the first carrier in a frequency domain.

20. The wireless device of claim 18, wherein the first carrier is associated with a first numerology and the second carrier is associated with a second numerology different than the first numerology.

* * * * *